United States Patent
Ledford et al.

(10) Patent No.: US 9,382,073 B2
(45) Date of Patent: Jul. 5, 2016

(54) RECONFIGURABLE TRANSPORTING SYSTEM

(71) Applicant: LOCKHEED MARTIN CORPORATION, Bethesda, MD (US)

(72) Inventors: Jordan T. Ledford, Baltimore, MD (US); Isaiah Abramson, Baltimore, MD (US); David C. Briggs, Edgewood, MD (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 71 days.

(21) Appl. No.: 14/317,857

(22) Filed: Jun. 27, 2014

(65) Prior Publication Data
US 2015/0375667 A1 Dec. 31, 2015

(51) Int. Cl.
*B60P 1/52* (2006.01)
*B63B 27/22* (2006.01)
*B63B 25/00* (2006.01)
*B65G 35/00* (2006.01)

(52) U.S. Cl.
CPC .............. *B65G 35/00* (2013.01); *B63B 25/00* (2013.01)

(58) Field of Classification Search
CPC ........... B60P 1/003; B60P 1/027; B60P 1/30; B62D 39/00; B63B 25/22; B65D 88/129; B65G 1/0478; B65G 67/603
USPC ......... 410/73; 414/143.2, 485, 462, 495, 498; 180/209; 296/35.3; 298/1 A
See application file for complete search history.

(56) References Cited

U.S. PATENT DOCUMENTS

| | | | |
|---|---|---|---|
| 3,356,040 A * | 12/1967 | Fonden ................. | B61B 13/125 104/130.01 |
| 5,857,413 A * | 1/1999 | Ward ......................... | B61J 1/10 104/130.01 |
| 6,077,024 A | 6/2000 | Trueblood | |
| 6,409,186 B2 * | 6/2002 | Bennington ................ | 180/19.3 |
| 6,910,844 B2 | 6/2005 | Trescott | |
| 7,203,570 B2 | 4/2007 | Karlen | |
| 7,845,898 B2 * | 12/2010 | Rawdon ................... | B64D 9/00 244/118.1 |
| 8,196,986 B2 | 6/2012 | Lorenzo et al. | |
| 8,398,136 B2 * | 3/2013 | Miles ..................... | A47B 77/10 296/1.01 |

OTHER PUBLICATIONS

Haacon Group, "Aircraft Loading System", http://www.haacon.de/en/lifting-systems/aircraft-loading-system.html, Mar. 7, 2014; 3 Pages.

* cited by examiner

*Primary Examiner* — Glenn Dayoan
*Assistant Examiner* — Sunsurraye Westbrook
(74) *Attorney, Agent, or Firm* — Kent Kemeny; Andrew M. Calderon; Roberts Mlotkowski Safran Cole & Calderon, P.C.

(57) ABSTRACT

A reconfigurable modular transporting system and related components which can efficiently and effectively move containers and other items is disclosed. The transport system includes a plurality of track components structured to mate with one another by a complementary male connection and female connection at ends thereof. The transport system further includes at least one hub component comprising a rotating track assembly which aligns with male and female track assemblies connected to at least one of the track components. The transport system further includes a plurality of truck assemblies engagable to the plurality of track components and the rotating track of at least one hub component.

25 Claims, 12 Drawing Sheets

RECONFIGURABLE TRANSPORTING SYSTEM

FIELD OF THE INVENTION

The invention is directed to a transporting system. More particularly, the invention is directed to a reconfigurable modular transporting system and related components which can efficiently and effectively move containers and other items.

BACKGROUND DESCRIPTION

Naval vessels traditionally have been designed to be single-purpose ships, e.g., for one mission type; however, modern ships are increasingly being built and designed to incorporate and support multipurpose missions. For example, littoral combat ships (LCS), Navy joint high-speed vessels (JHSVs) and generic offshore patrol vessels (OPVs), among others, are currently being designed to be multi-purpose with reconfigurable spaces allowing for flexibility in mission package equipment. In such designs, ships require the capability to change mission module equipment in a timely and efficient manner. The timely change out of mission module equipment is crucial to allow the vessel to return to service as soon as possible.

Change out of mission packages requires special-purpose systems to mobilize and transition modules to stowage locations onboard a vessel. The special-purpose transport systems typically need to be maneuverable in very small spaces. Although there are many systems currently in use, there exist no viable mobilization systems that combine simplicity, speed, low-maintenance, low-cost, flexibility, and ease of use into a single package. For example, commercially available systems such as powered prime mover-type trucks are difficult to maneuver in confined spaces, are heavy (which affects overall ship payload and stability), are expensive to operate and do not have the flexibility needed to efficiently transport and stow large containers used to store and transport the mission module equipment. And, by way of illustration, the use of current mobilization systems, e.g., powered trucks, gantry cranes, etc., can take upwards of three hours to move one container to stowage.

SUMMARY OF THE INVENTION

In an aspect of the invention, a transport system comprises a plurality of track components structured to mate with one another by a complementary male connection and female connection at ends thereof. The transport system further comprises at least one hub component comprising a rotating track assembly which aligns with male and female track assemblies connected to at least one of the track components. The transport system further comprises a plurality of truck assemblies engagable to the plurality of track components and the rotating track of at least one hub component.

In another aspect of the invention, a transport system comprises: a plurality of track components structured to mate with one another with drop-in placement capability by complementary male and female connections at ends thereof; a locking mechanism to lock together adjacent ones of the plurality of track components, in an assembled state; a plurality of truck assemblies engagable to the plurality of track components and the rotating track, wherein at least one of the plurality of truck assemblies comprises at least one of a motor and braking system; and at least one hub component comprising a rotating track assembly to accommodate directional changes during transit of the plurality of truck assemblies thereon, and which is alignable with at least one of the plurality of track components connected to a male or female track assembly.

In still yet another aspect of the invention, a transport system comprises a plurality of truck assemblies each comprising: a base plate; a rotatable mounting assembly mounted to the base plate by a bearing assembly, and which is structured to connect with a corner block of a container; a plurality of wheels or casters connected to a downwardly extending plate from the base plate; and a plurality of guiding cams extending downward to ensure the truck assemblies remain on a track assembly.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to a transporting system. More particularly, the invention is directed to a reconfigurable transporting system and related components which can efficiently and effectively move containers and other items. The reconfigurable transporting system is modular, and can be configured into many different arrangements within confined spaces, such as on vessels or within a warehouse environment. For example, the invention could be used in vessels, e.g., military vessels, or extended for use in the commercial freight industry including end users like cargo or shipping firms, trucking companies, and warehouse operations or factories to move items within certain spaces.

In embodiments, the reconfigurable transporting system comprises modular track components which are configurable into many different track arrangements, accommodating a host of different space requirements. The transporting system further includes active and passive truck assemblies which are designed and structured to transport containers and other items on the many different track arrangements. In this way, the system of the present invention can perform mission module mobilization and change out on-board vessels, as well as within other spaces, e.g., a warehouse, factory, etc.

Advantageously, the reconfigurable transporting system of the present invention offers many advantages over conventional transporting systems. For example, and without limitations, by using the reconfigurable transporting system it is now possible to:

(i) transport containers or other items within areas of a vessel which are otherwise not readily accessible using conventional transporting systems, including accommodating 90° direction changes during transit;

(ii) reduce cost, time (e.g., reduce mission package change out time) and weight requirements for transporting items between, e.g., stowage areas and end-use areas, over baseline conventional systems;

(iii) provide modularity or system flexibility to accommodate different track arrangements (movement combinations), space requirements and customer demands, e.g., to meet different stowage and transport requirements;

(iv) provide positive control over payloads during transportation, e.g., by using active truck assemblies with, e.g., braking systems;

(v) minimize maintenance and tooling requirements, e.g., the track components have drop-in placement capability;

(vi) lower stowage footprint/volume requirements over current baseline conventional systems; and (vii) retrofit to existing spaces, e.g., vessels, etc., without the need for any modifications to existing structures.

Figure 1:
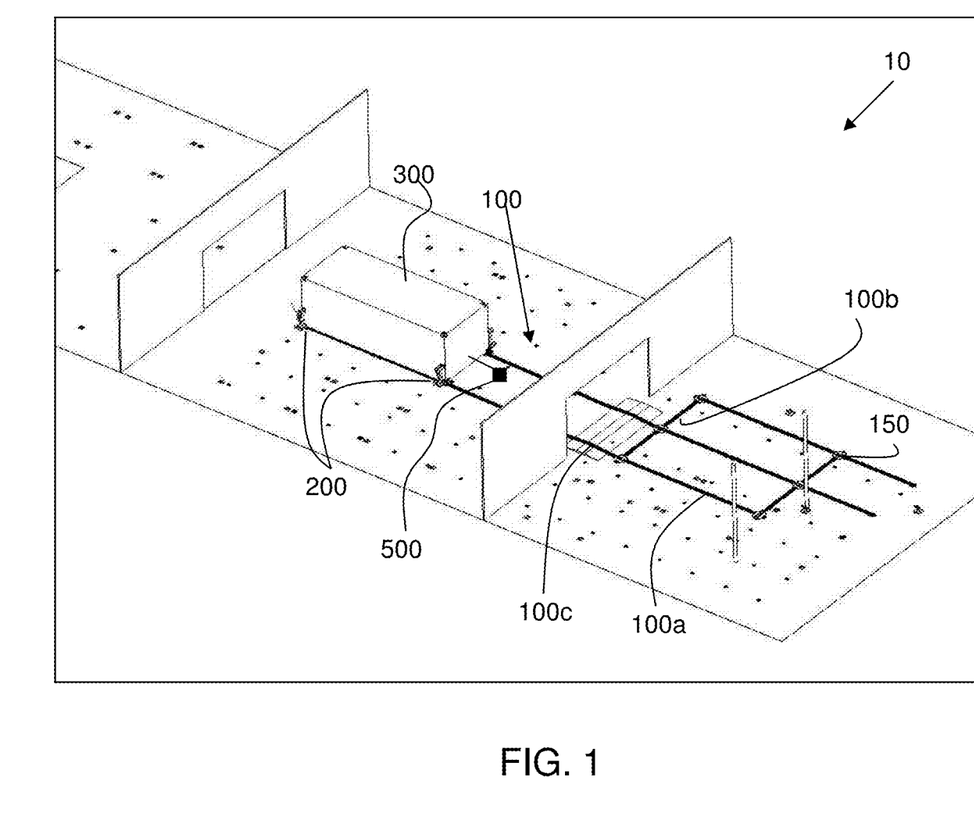
FIG. 1 shows an overview of a transporting system and related components of the present invention.

FIG. 1 shows an overview of a transporting system and related components of the present invention. In particular, the transporting system and related components comprise modular track components 100 which are reconfigurable into many different track arrangements, thereby accommodating a host of different space requirements. In embodiments, the track components 100 can be permanently affixed to the floor/deck surface or removable. In additional embodiments, the track components 100 can even be recessed into the floor surface if desirable. The track components 100 can also be configured as a single center guide rail with outlying casters in somewhat of a monorail configuration.

The track components 100 include one or more rotating hub systems 150, accommodating 90° direction changes during transit; although other direction changes, e.g., 45° direction changes, are also contemplated by the present invention. The track components 100 and rotating hub systems 150 have drop-in placement capability which facilitates assembly while reducing tooling requirements. The track components 100 and rotating hub systems 150 can be made from any suitable material including, for example, aluminum, steel, etc.

Still referring to FIG. 1, the transporting system further includes active and passive truck assemblies shown representatively at reference numeral 200. The active and passive truck assemblies 200 are designed and structured to transport containers 300 (or other items) on the many different track arrangements 100 using, for example, a winch and pulley system 500. In embodiments, the active and/or passive truck assemblies 200 can include a battery powered drive motor, which would eliminate the need for the winch and pulley system 500. In further embodiments, the active and/or passive truck assemblies 200 can include hydraulic or pneumatic-powered motors, even combustion engines depending on environment and available utilities, for example.

As further shown in FIG. 1, the active and passive truck assemblies 200 can be attached to ISO block corners of the container 300 or other mechanism (e.g., frame structure) for moving items, thereby allowing for transit of different types of items over a specific rail layout for a target ending location. In embodiments, the corner blocks can be standard sized blocks in compliance with ISO 1161, with the container being standard sized in compliance with ISO 668; although, other sizes and interfaces are also contemplated by the present invention such that the ISO block corners and size defined herein are merely one non-limiting illustrative example implemented in the present invention.

By way of example, the specific rail layout can include any combination of straight sections 100a, 90° direction changes 100b (using the hub system 150) and elevation changes 100c. See, e.g., FIGS. 12A-12C for different illustrative track arrangements. In this way, the modular track components 100 can accommodate many different space arrangements within, e.g., a vessel, warehouse, factory, etc.

Figure 2A:
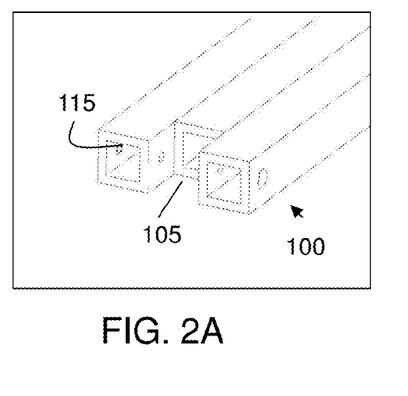
FIGS. 2A-2D show track components of the transporting system in accordance with aspects of the present invention.
Figure 2B:
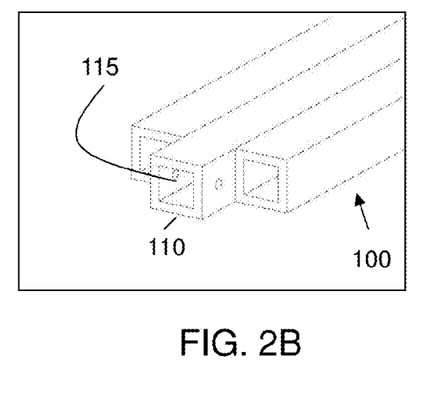

FIGS. 2A-2D show track components of the transporting system in accordance with aspects of the present invention. More specifically, FIG. 2A shows a track component 100 with a female interface 105; whereas, FIG. 2B shows a track component 100 with a male interface 110. It should be understood by those of skill in the art that FIGS. 2A and 2B can represent opposing ends of a single track component 100. In embodiments, the track components 100 can be formed from extruded tubing welded together in the male and female configuration, each with a standard cross-section for any track length or configuration to accommodate necessary transit routes/directions. The track components can also be a one piece extrusion.

Moreover, it should be understood by those of skill in the art that other track components can be provided, in different sizes and cross sectional shapes. For example, the track components can include a toothed rail that could interface with a gear, or a triangular cross-section. In embodiments, the gear can be powered (e.g., in lieu of a non-powered winch system), to walk along the toothed rail profile. Also, as described herein, the track components can be reusable due to the standard male-female interfaces, and their modularity allows for leapfrogging the track components (as described with regard to FIGS. 12A-12C), as well as replacing a damage section of track if needed.

Figure 2C:
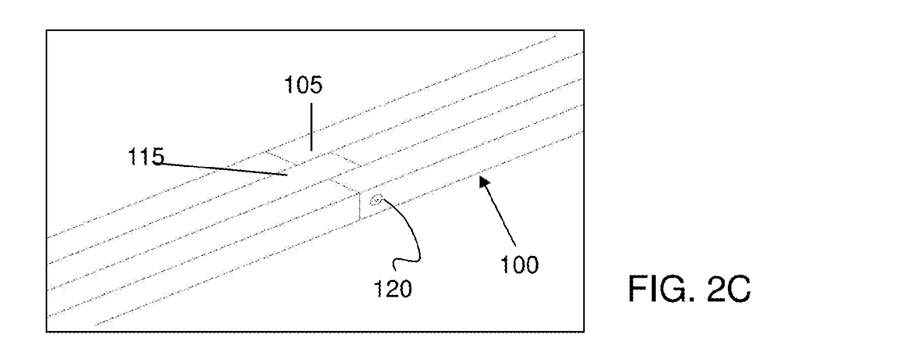

In embodiments, the track components 100 each include a track pin connection hole 115 for accommodating a locking pin 120 (see, e.g., FIG. 2C) and allowing drop-in placement capability which facilitates assembly while reducing tooling requirements. More specifically, as shown in FIG. 2C, the female interface 105 and male interface 110, which are complementary to one another, can be locked together by the locking pin 120 to form a configurable track system. It should be understood by those of skill in the art, though, that other locking or connecting mechanisms can be used with the present invention. For example, the locking pin can be replaced by a bolt and nut system, positive locking pins, detent pins, detent clevis pins, spring plungers, ball plungers, latches, catches, teeth, and barbs, etc., all of which are represented by reference numeral 120.

Figure 2D:
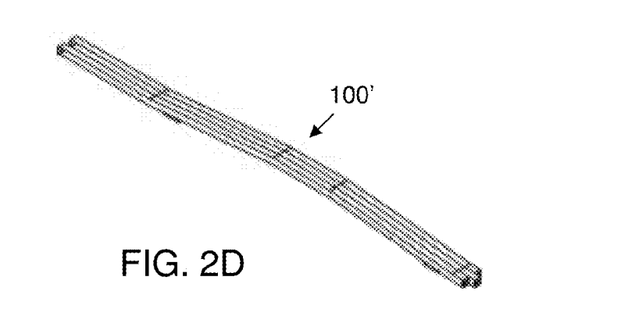

FIG. 2D shows a curved track or bridge section 100'. In this representation, the bridge section 100' can extend over a threshold, wiring runs, piping, conduits, etc., or provide other elevation changes, in order to accommodate different spaces. The curved track or bridge section 100' can be used in combination with any of the other track components, and can also include the female and male interfaces. In embodiments, the components can also have other configurations such as, for example, curved tracks, which can be configured into a fully circular track to fully rotate payload orientation.

FIGS. 3A-3D show various views of a hub component of the transporting system in accordance with aspects of the present invention. More specifically, FIGS. 3A-3D show a hub component 150 with a rotating track or rail 160, which can be fixed between and aligned with male and female track assemblies 170. In embodiments, the rotating track or rail 160 can be locked to the male and female track assemblies 170 by a ball and detent system 172; although other locking mechanisms are also contemplated by the present invention.

Figure 3A:
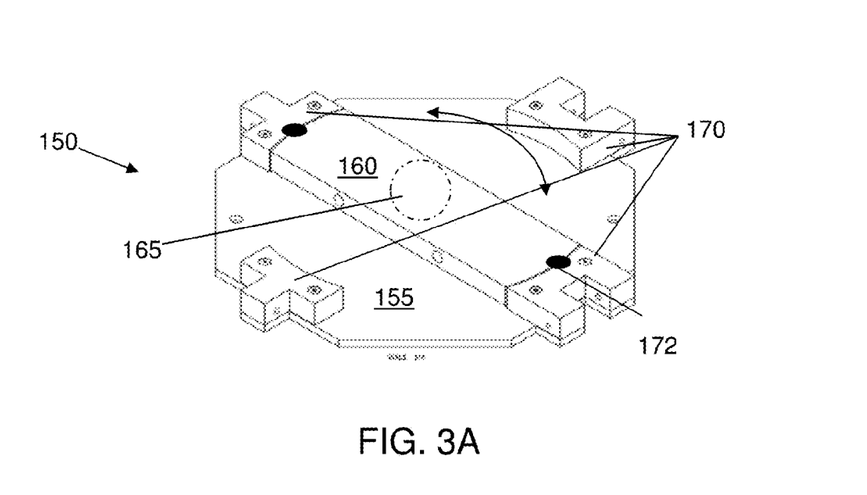
FIGS. 3A-3D show different views of a hub component of the transporting system in accordance with aspects of the present invention.
Figure 3B:
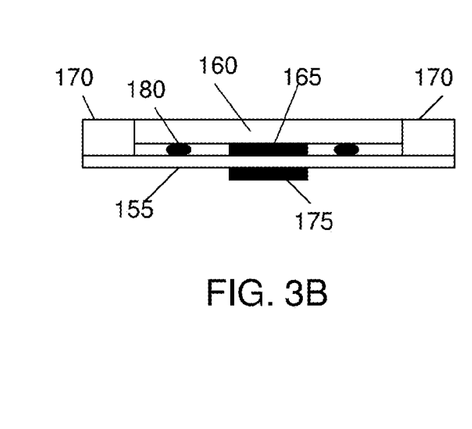

As shown more particularly in FIGS. 3A and 3B, the rotating track or rail 160 can be mounted to a mounting plate 155, by a bearing assembly 165. As should be understood by those of skill in the art, the bearing assembly 165 provides a mechanism for rotating the rotating track or rail 160 between different orientations and in alignment with the male and female track assemblies 170.

As further shown in FIG. 3B, a mounting block 175 extends below an underside surface of the mounting plate 155. The mounting block 175 can be configured to mate with a mounting socket within a floor, e.g., of a vessel. By using the mounting block 175 and mounting socket combination, it is possible to fix the hub component 150 to a specific flooring space, ensuring stability of the system. In optional embodiments, the rotating track or rail 160 can move smoothly on roller bearings or other gliding mechanisms 180 to facilitate the rotation of the rotating track or rail 160 between opposing male and female track assemblies 170.

Figure 3C:
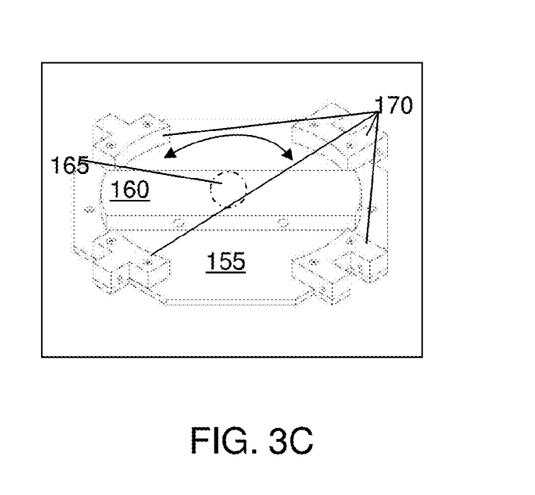

As shown in FIG. 3C, the rotating track or rail 160 can rotate in either a clockwise or counter clockwise direction. That is, the rotating track or rail 160 can rotate in a full 360° rotation, in either direction. The rotation of the rotating track or rail 160 can be provided manually or by a motorized mechanism, e.g., electric motor mounted in the rotating track or rail 160. By rotating the rotating track or rail 160, the rotating track or rail 160 can be aligned with different male and female track assemblies 170 allowing for change of direction of a container or other item, during transport.

Figure 3D:
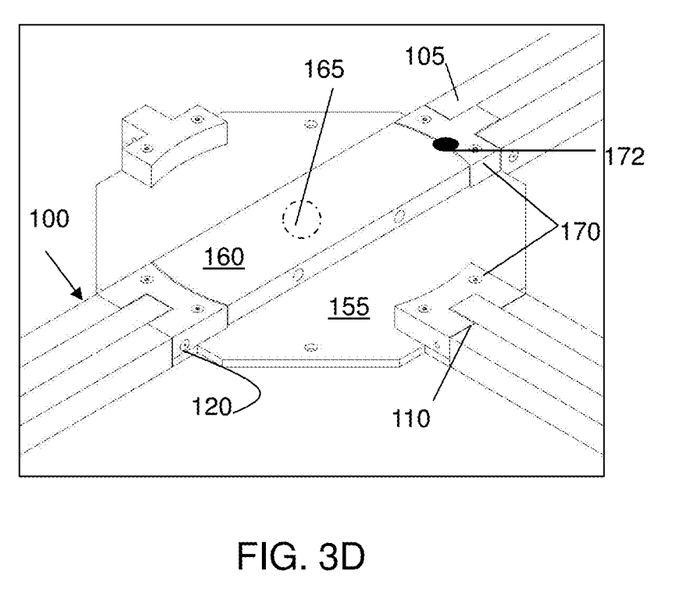

Although FIG. 3C shows the male and female track assemblies 170 separated by 90°, one of skill in the art should realize that such male and female track assemblies 170 can be separated by other angles, spaces or provided in other arrangements depending on the specific configuration requirements. In any scenario, as shown in FIG. 3D, the male and female track assemblies 170 can be connected to the female interface 105 and male interface 110 of different track components 100 by the locking mechanism 120.

Figure 4:
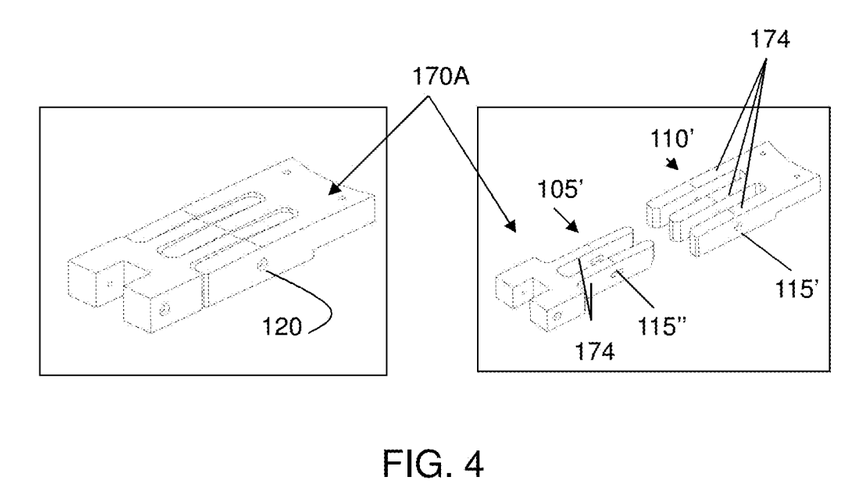
FIG. 4 shows an expansion joint in accordance with aspects of the present invention.

FIG. 4 shows an expansion joint in accordance with aspects of the present invention. More specifically, the expansion joint 170A can be mounted to the mounting plate 155 of the hub component 150, replacing the replaceable male and female track assemblies 170. By using the expansion joint 170A, it is possible to provide additional flexibility to the transport system by adjusting a length of the track system to accommodate different flooring spaces or different tolerances in mounting socket spacing. As with the male and female track assemblies 170, the expansion joint 170A can be connected to the female interface 105 and male interface 110 of different track components 100 by the locking mechanism 120.

In more specific embodiments, the expansion joint 170A includes a female interface 105' and male interface 110' comprising multiple fingers 174. In embodiments, the fingers 174 of the female interface 105' and male interface 110' can be connected by interleaving the fingers 174 together. The fingers 174 can then be locked together by a locking pin 120, through a track pin connection hole 115'. It should also be understood by those of skill in the art that other locking or connecting mechanisms can be used with the present invention as already discussed herein. In embodiments, the track pin connection hole 115' includes a slot 115" (on either expansion joint), which provides additional flexibility in accommodating any tolerances in the mounting socket spacing or other flooring requirements.

Figure 5A:
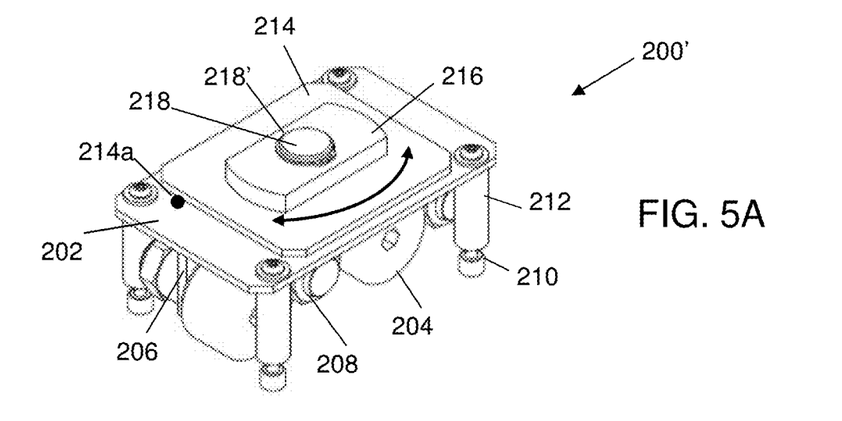
FIGS. 5A-5C show different views of a passive truck assembly of the transporting system in accordance with aspects of the present invention.
Figure 5B:
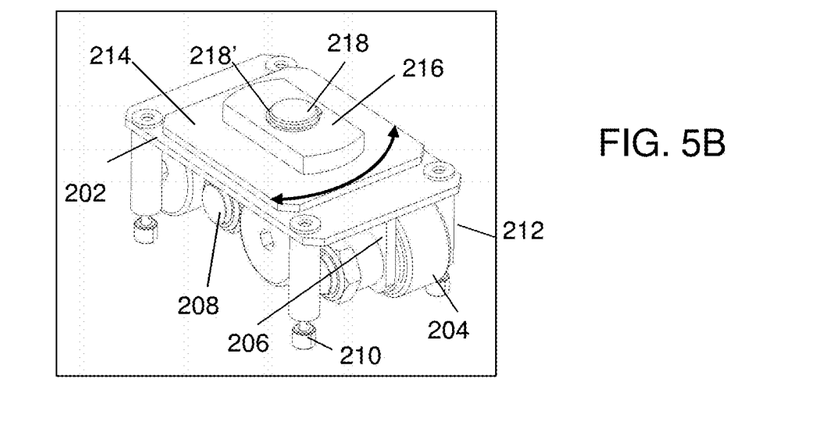
Figure 5C:
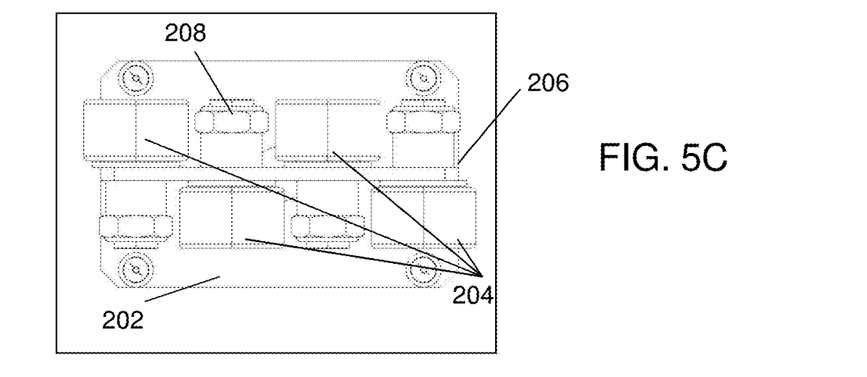

FIGS. 5A-5C show various views of a passive truck assembly of the transporting system in accordance with aspects of the present invention. More specifically, FIGS. 5A and 5B show different perspective views of the passive truck assembly 200'; whereas, FIG. 5C shows an underside view of the passive truck assembly 200'.

As shown in FIGS. 5A-5C, the passive truck assembly 200' includes a plurality of wheels or casters 204 on an underside of the base plate 202, connected to a vertically extending dividing plate 206. In embodiments, the combination of the base plate 202 and the vertically extending dividing plate 206 form a T-beam. The wheels or casters 204 can be connected to the vertically extending dividing plate 206 by a nut or other connecting mechanism (e.g., block (see, e.g., FIG. 6D)) 208. In embodiments, the wheels or casters 204 can be provided in a staggered configuration to distribute any loads on the track system; although other configurations are also contemplated by the present invention. The wheels or casters 204 can be steel, nylon or other low friction material, amongst other materials. The material can be selected based on maximum loads and/or track surface, amongst other examples.

A plurality of guiding cams 210 extend downwardly from the base plate 202. In embodiments, the guiding cams 210 are connected to the base plate 202 by a pin or rod assembly 212. In embodiments, the guiding cams 210 are structured and spaced apart to ensure the passive truck assembly 200' remains on the track assembly 100 during transport. For example, guiding cams 210 are spaced apart to extend on sides of track components, in an assembled state. The guiding cams 210 can also assist in the movement of the passive truck assembly 200'.

Still referring to FIGS. 5A-5C, a rotatable mounting assembly comprising a block interface 214 is rotatably connected to an upper side of the base plate 202 by a pin and bearing assembly represented at reference numeral 218. In embodiments, the pin and bearing assembly 218 can lock to the block interface 214 by a retention ring 218', for example. The rotatable block interface 214 allows a container to change direction, e.g., 90° direction, as it is moving along the track assembly. More specifically, the rotatable block interface 214 allows a container to change direction, e.g., 90° direction, as the rotating track or rail 160 of the hub component 150 is being rotated. In embodiments, the block interface 214 includes a mounting surface 216, which can interface with a corner interface of a container, as one of different embodiments described herein.

It should be understood that the rotatable block interface 214 can freely rotate; although, in embodiments, a locking mechanism, e.g., pin 214a, can be provided in order to prevent any relative rotation between a container and the truck assembly during straight line movement. In additional embodiments, the rotatable block interface 214 or the entirety of the truck assembly can include a lifting mechanism integrated into the truck assemblies. In embodiments, the lifting mechanism can be represented also as reference numeral 214, and is contemplated to be electrically, pneumatically, or hydraulically powered. In this way, it is possible to lift the truck assembly or portions thereof without a hand-cranked jack, for example.

Figure 6A:
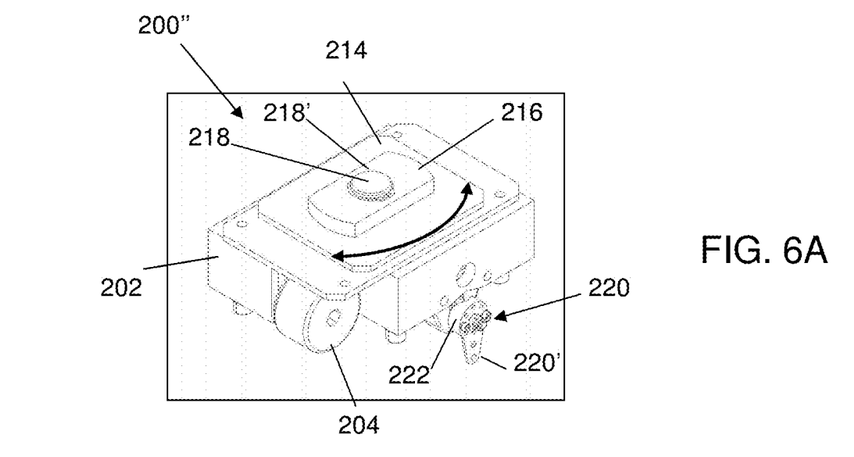
FIGS. 6A-6C show different views of an active truck assembly of the transporting system in accordance with aspects of the present invention.
Figure 6B:
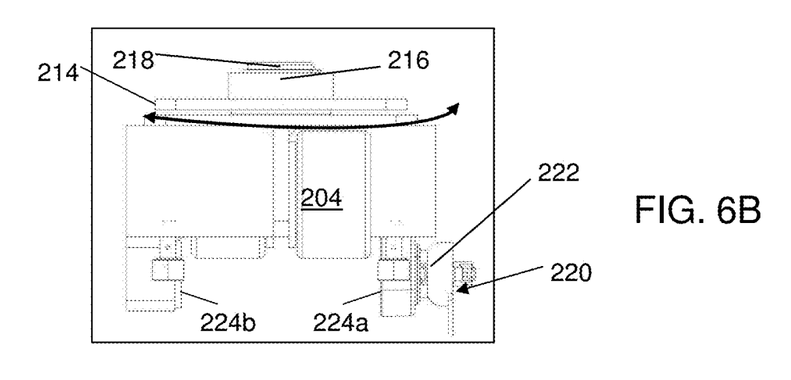
Figure 6C:
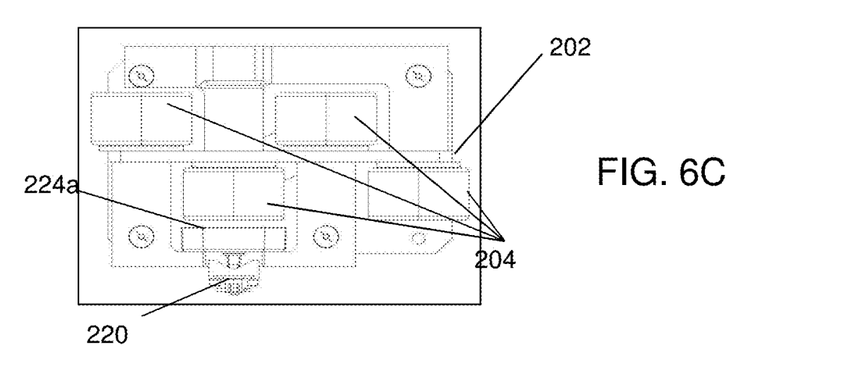
Figure 6D:
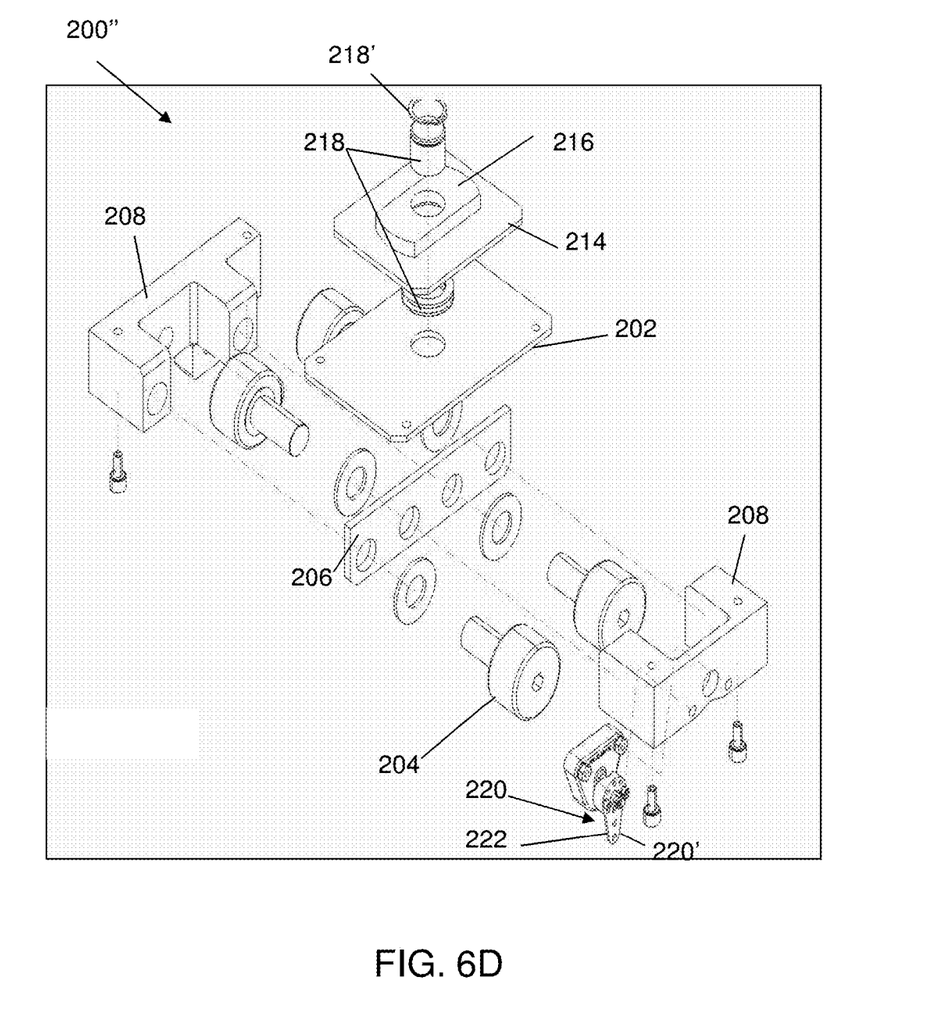
FIG. 6D shows an exploded view of the active truck assembly shown in FIGS. 6A-6C, in accordance with aspects in the present invention.

FIGS. 6A-6C show various views of an active truck assembly of the transporting system in accordance with aspects of the present invention. FIG. 6D shows an exploded view of the active truck assembly shown in FIGS. 6A-6C. The active truck assembly 200" includes the components of the passive truck assembly 200', in addition to a braking system shown generally at reference numeral 220. In embodiments, the braking system 220 includes a spring loaded cam mechanism 222 which, when rotated, will move a brake pad 224a towards a fixed brake pad 224b. Accordingly, by rotating the cam mechanism 222, the brake pad 224a will move inwardly resulting in friction between the brake pads 224a, 224b and the track components. In this way, positive control (braking) can be applied to the truck assembly 200" and hence its payload during transportation. It should also be understood by those of ordinary skill in the art that the active truck assembly 200" can include any combination of a drive motor and a braking system, for example.

In embodiments, the brake system 200 can be actuated by a handle which engages a lever 220' attached to the cam mechanism 222. The brake system 220 can also be hydraulic or cable-actuated, which can be controlled remotely, e.g., remote control, as should be understood by those of ordinary skill in the art. In embodiments, in a geared track configuration, a non-back driveable motor can be used to provide resistance to movement in lieu of a braking system (also shown representatively as reference numeral 220). In further embodiments, the motor can have a brake that is actuated off when the motor is energized which, in embodiments, can create a dead man's brake system.

Figure 7A:
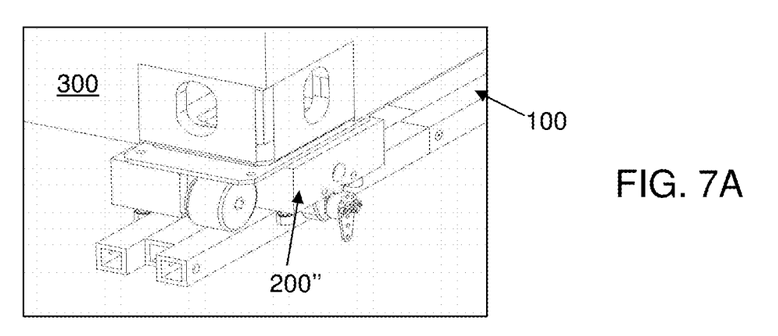
FIG. 7A shows the active truck assembly on a track component in accordance with aspects of the present invention.

FIG. 7A shows the active truck assembly 200" on a track assembly 100, attached to an upper interface with a standard ISO container corner block or other type of interface. In embodiments, any configuration of the truck assembly can attach to a bottom of the container, or, in alternate embodiments, attached to the sides of the container, if necessary. In any aspect of the present invention, as shown in this representation, the wheels or casters 204 are engaged with (e.g., landed on) the track assembly 100 and the guiding cams 210 are structured and spaced apart to ensure the active truck assembly 200" remains on the track assembly 100 during transport, e.g., acts as a guide during transport along the track assembly 100, to prevent lateral movement perpendicular to general movement direction, which thus ensures that the wheels stay in line on the track. It should be understood by those of ordinary skill in the art that FIG. 7A can also be representative of the passive truck assembly 200', riding on the track assembly 100.

Figure 7B:
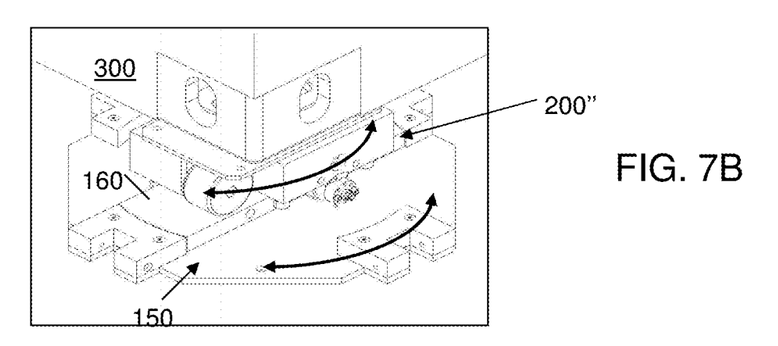
FIG. 7B shows a truck assembly riding on the hub component in accordance with aspects of the present invention.

FIG. 7B shows the active truck assembly 200" engaged with (e.g., landed on) the hub component 150. More specifically, in this representation, the hub component 150 and more specifically the track or rail 160 is shown being rotated while the active truck assembly 200" remains fully landed on the track or rail 160. As the track or rail 160 is being rotated, the rotatable block interface 214 will also rotate in order to allow a payload, e.g., container 300, to change direction, e.g., 90° direction, as it is moving along the track assembly. It should be understood by those of ordinary skill in the art that FIG. 7B can also be representative of the passive truck assembly 200', riding on the track assembly 100.

In embodiments, the payload (e.g., container) does not change orientation relative to the environment, only the movement direction changes. This is conducive for generally 90° movements in which the payload starting orientation is the same as the ending orientation with no orientation change necessary in between locations. The present invention, though, can be used to change the overall orientation of the payload (if curved tracks were placed in a complete circle, for example.

Figure 7C:
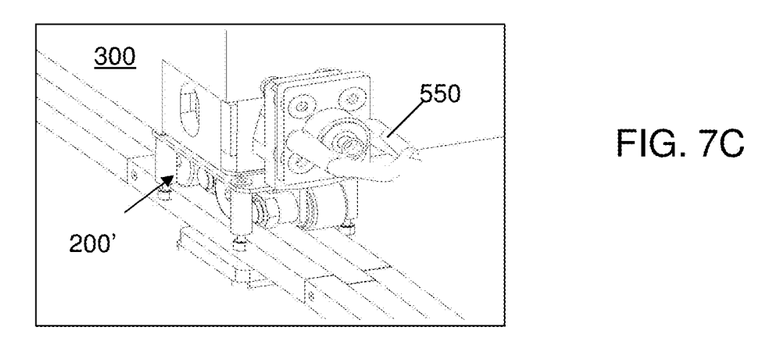
FIG. 7C shows a truck assembly with a pulling fixture in accordance with aspects of the present invention.

FIG. 7C shows the passive truck assembly 200' with a pulling fixture 550 attached to the container 300. More specifically, in this representation, the payload, e.g., container 300, can be pulled along the track assembly 100 using a winch, pulley system or interface with a powered truck mover by attaching a cable to the pulling fixture 550. In embodiments, the pulling fixture 550 can be a loop or other mechanism which is structured to allow a cable to be attached thereto.

In embodiments, the winch can be, for example, DC or AC powered, hydraulic or air-powered. Alternatively, the present invention also contemplates using a fixed pulley anchored to a deck or the track, itself. The winch and/or pulley can be used to pull the container, as well as assisting in the redirection of the truck assemblies during transit. It should be understood by those of ordinary skill in the art that FIG. 7C can also be representative of any combination of the passive truck assembly 200' or the active truck assembly 200", riding on the track assembly 100.

Figure 8A:
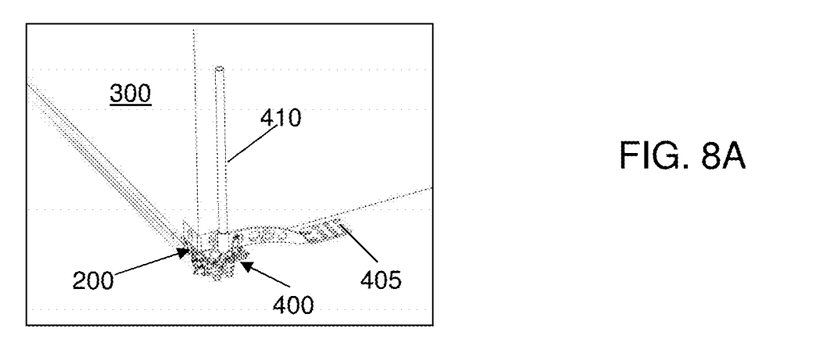
FIGS. 8A-8C show a braking system used with the active truck assembly, in accordance with aspects of the present invention.
Figure 8B:
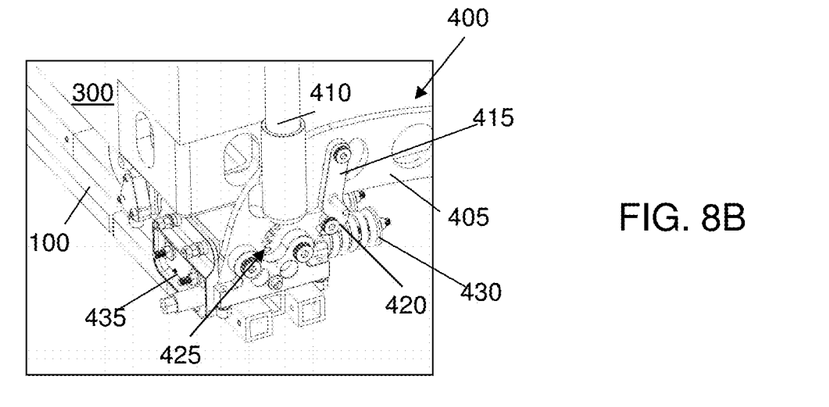
Figure 8C:
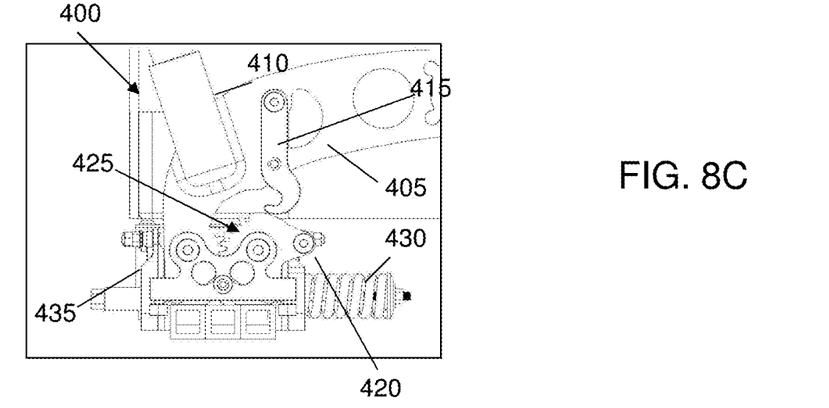

FIGS. 8A-8C show a braking system used with the active truck assembly in accordance with aspects of the present invention. FIG. 8A shows an overview of a safety brake system 400. In embodiments, the safety brake system 400 provides an "always-on" brake functionality, requiring the operator to disengage the brakes (e.g., dead-man style system) in order to transport the container 300. The safety brake system 400 includes a mechanical foot lever 405 and/or hand lever 410 to release the brakes, i.e., the operator steps on the mechanical foot lever 405 to disengage the brakes to allow container movement. As such, when the operator steps off the mechanical foot lever 405, e.g., the operator no longer applies a downward force onto the mechanical foot lever 405, the brakes will deploy, engaging the track components and stopping movement of the container 300. In embodiments, the brakes can be spring loaded in order to provide such automatic engagement capabilities, e.g., "always-on" brake functionality.

FIGS. 8B and 8C show an enlarged view of the safety brake system 400 of the present invention. As shown in FIGS. 8B and 8C, the safety brake system 400 includes an optional latch or hook 415 provided on the mechanical foot lever 405. As shown in FIG. 8B, the latch 415 is structured to engage a locking pin 420 provided on a ratchet gear mechanism 425. By engaging the latch 415 with the locking pin 420, the ratchet gear mechanism 425 will rotate, overcoming a spring force applied by the spring 430. This, in turn, will disengage (release) the brake pads 435 from the track assembly, allowing movement of the truck assembly 200. In this way, the "latching" mechanism can be used to reduce operator work during movement of the container, i.e., the operator will no longer need to constantly apply downward force to the mechanical foot lever 405 during container transport. On the other hand, as shown in FIG. 8C, by disengaging the latch 415, e.g., the operator is no longer applying a downward force to the mechanical foot lever 405, the force of the spring 430 will automatically move the brake pads 435 into engagement with the track assembly 100 to stop movement of the truck assembly 200.

Figure 9A:
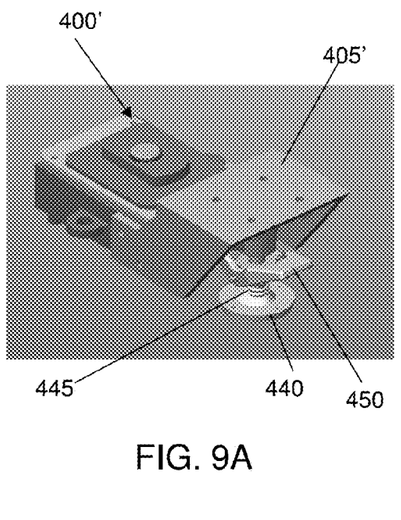
FIGS. 9A-9B show an alternative active truck assembly in accordance with aspects of the present invention.
Figure 9B:
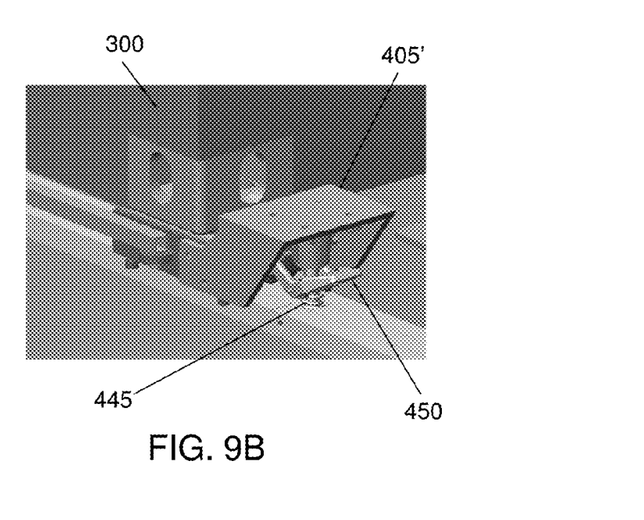

FIGS. 9A-9B show an alternative active truck assembly in accordance with aspects of the present invention. As in the braking system of FIGS. 8A-8C, the brake system 400' provides an "always-on" brake functionality, requiring the operator to disengage the brakes (e.g., dead-man style system) in order to transport the container 300. The safety brake system 400' includes a mechanical foot lever 405' to release the brake 440, i.e., the operator steps on the mechanical foot lever 405' to disengage (release) the brake 440 to allow container movement. As such, when the operator steps off the mechanical foot lever 405', e.g., the operator no longer applies a downward force onto the mechanical foot lever 405', the brake 440 will deploy, engaging a top portion of the track components and stopping movement of the container 300. In embodiments, the brake 440 can be spring loaded (e.g., using spring 445 and a cam lever 450) in order to provide such automatic engagement capabilities, e.g., "always-on" brake functionality.

Figure 10:
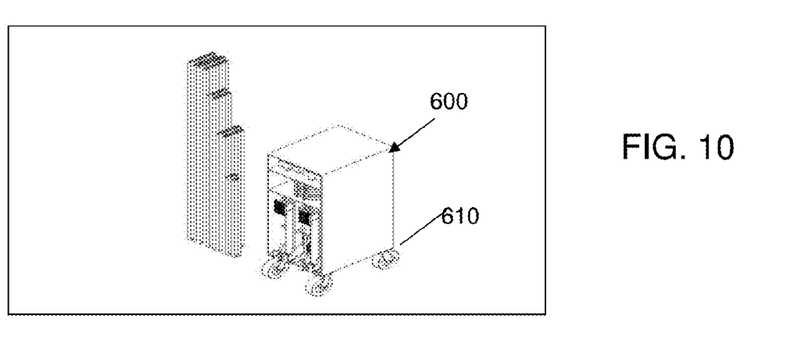
FIG. 10 shows a storage container and storage arrangement in accordance with aspects of the present invention.

FIG. 10 shows a storage container and storage arrangement in accordance with aspects of the present invention. The storage container 600 includes shelving to store the components of the track system, e.g., hub component, etc. In embodiments, the storage container 600 can be a rolling system storage cabinet with swivel wheels or casters 610, thereby allowing the operator or mechanic to move components to a desired location, e.g., between a first location and second location.

Figure 11:
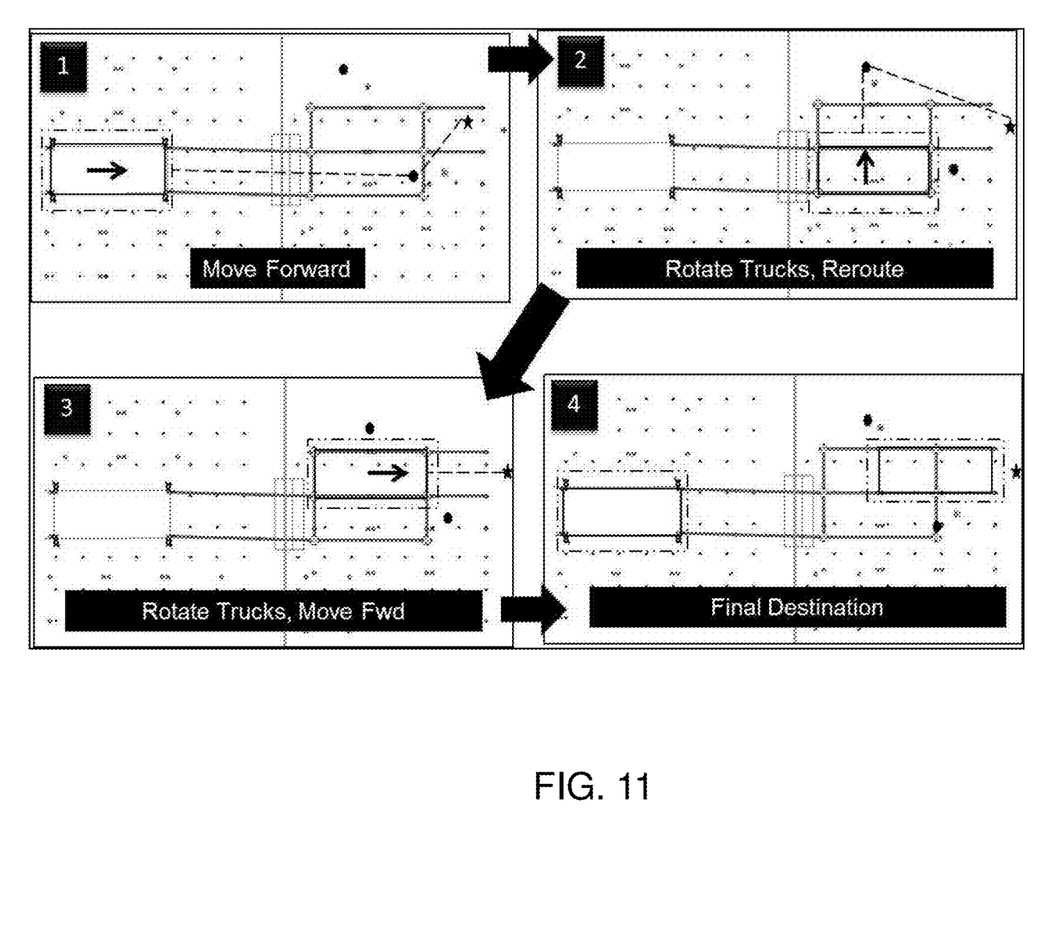
FIG. 11 shows a method of moving a container using the transporting system of the present invention.

FIG. 11 shows a representative method of moving a container using the transporting system of the present invention. By way of non-limiting illustrative example, in step 1, the container is lowered onto the truck assemblies and then moved in a forward direction represented by the arrow. The container can be moved by a pulley or winch system, or by motors within the truck assemblies. For example, the winch could be attached at the end of the track and to the container so that the container can be pulled along the track to the desired location.

As the container enters the directional change zone, in step 2, the rail system of the hub component and the block interface of the truck assemblies will rotate 90°, in order to reroute the container in a new direction, e.g., a 90° direction change. A set of pulleys can be used to redirect the movement of the container, in this zone. By way of example, in this illustration it should be understood by those of skill in the art that the winch and hook would be removed from the front of the container (based on direction of movement) and placed on the side of the container (based on the new direction of movement) such that cables would then be routed through an additional pulley configuration to move the container in a new direction. In this way, the container can now be transported sideways for a certain distance. Although the container is shown to be redirected by 90°, it should be understood that other directional changes are also contemplated by the present invention.

In step 3, the rail system of the hub component and the block interface of the truck assemblies are again rotated 90°, thereafter while the container is pulled in a forward direction, represented by the arrow. Also, the winch cable will be rerouted and attached to the front of container again to accommodate the directional change in movement. In step 4, the container reaches its final destination. Once the container has reached its final destination, e.g., stowage location, it can be raised using jacks and removed from the track, e.g., truck assemblies. In alternative embodiments, a lifting mechanism can be integrated into the truck assemblies. In this way, the containers can be easily moveable and rearranged for large-scale mission package change outs or other purposes as described herein. It should also be understood by those of skill in the art that track components used in any previous steps can be removed and used to extend the track assembly for additional transport of the container.

Figure 12A:
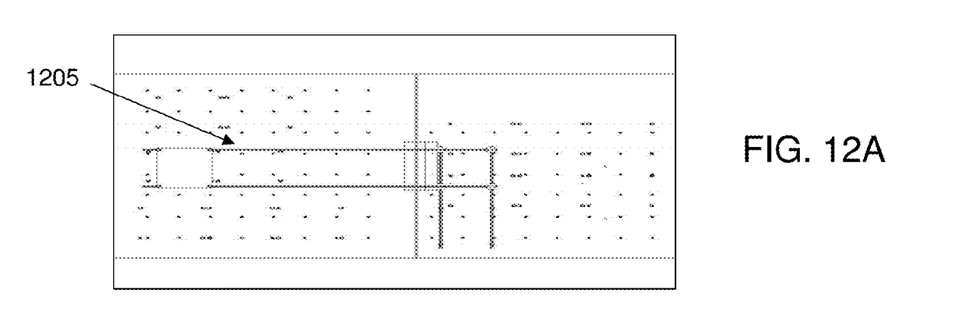
FIGS. 12A-12C show various different track arrangements in accordance with aspects of the present invention.
Figure 12B:
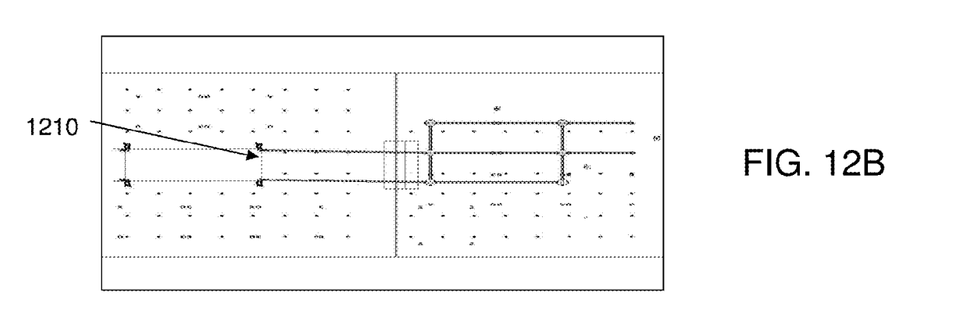
Figure 12C:
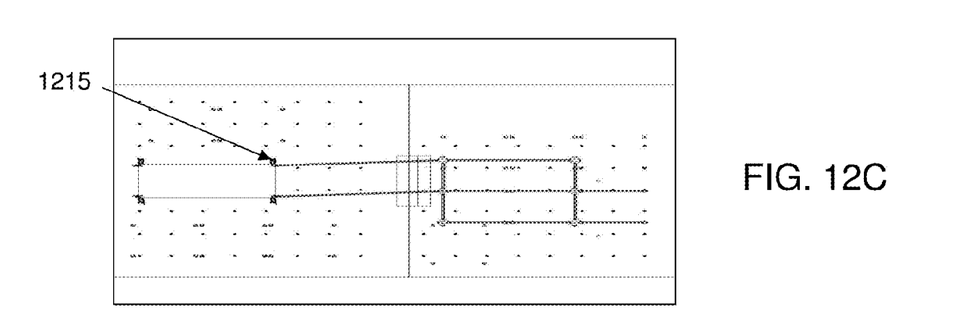

FIGS. 12A-12C show various different track arrangements 1205, 1210 and 1215 in accordance with aspects of the present invention. It should be understood by those of skill in the art that the various different track arrangements 1205, 1210 and 1215 are shown as exemplary illustrations and should not be considered limiting features of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

It is further noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A transport system, comprising:
   a plurality of track components structured to mate with one another;
   at least one hub component comprising a rotating track assembly which connects to at least one of the track components and which is rotatable; and
   a plurality of truck assemblies engagable to the plurality of track components and the rotating track of at least one hub component, wherein the plurality of truck assemblies are rotatable relative to its payload.

2. The transport system of claim 1, wherein the rotating track assembly and the plurality of truck assemblies rotate in unison relative to the payload, and the payload remains in a same orientation during the rotation.

3. The transport system of claim 1, wherein the plurality of track components are modular and configurable into different track arrangements by drop-in placement capability.

4. The transport system of claim 1, wherein the plurality of track components includes at least one track component comprising an elevation change.

5. The transport system of claim 1, further comprising a locking mechanism for locking the plurality of track components together and/or with the least one hub component.

6. The transport system of claim 1, wherein the at least one hub component is structured to accommodate directional changes during transit of the plurality of truck assemblies thereon, and comprises:
- a base plate;
- a bearing assembly rotatably mounting the rotating track to the base plate; and
- track assemblies connected to the base plate and alignable with ends of the rotating track.

7. The transport system of claim 6, wherein the at least one hub component further comprises a lock assembly structured to lock the rotating track to a fixed position.

8. The transport system of claim 6, wherein the at least one hub component further comprises a mounting block extending from an underside of the base plate and configured to mate with a mounting socket within a floor.

9. The transport system of claim 6, further comprising adjustable expansion joints mounted to the at least one hub component and alignable with the rotating track assembly.

10. The transport system of claim 1, wherein the plurality of truck assemblies include active truck assemblies and passive truck assemblies, each comprising:
- a rotatable mounting assembly structured to connect with a corner block of the payload; and
- a plurality of wheels or casters structured to engage the plurality of track components and the rotating track, in an assembled state.

11. The transport system of claim 10, wherein the active truck assemblies and passive truck assemblies, each further comprise a plurality of guiding cams extending downward, which are structured to be positioned on sides of the plurality of track components when in an assembled state.

12. The transport system of claim 10, wherein the active truck assemblies comprise a brake system.

13. The transport system of claim 10, wherein the active truck assemblies comprise a brake system comprising always-on brake functionality, requiring positive disengagement.

14. The transport system of claim 13, wherein the brake system comprises:
- a mechanism structured to automatically retain brake pads in a stopping position;
- a release mechanism to release the brake pads from the stopping position, by application of force; and
- a latch system to maintain the brake pads in the released position.

15. The transport system of claim 13, wherein the brake system comprises a spring and a cam lever structured to automatically retain brake pads in a stopping position.

16. A transport system, comprising:
- a plurality of track components structured to mate with one another with drop-in placement capability by complementary connections at ends thereof;
- at least one hub component comprising a rotating track; and
- a plurality of truck assemblies engagable on the plurality of track components, each of which include a rotatable portion which rotates in unison with the rotating track while a payload on the plurality of truck assemblies remains in a same orientation.

17. The transport system of claim 16, wherein the plurality of track components includes at least one track component comprising an elevation change.

18. The transport system of claim 16, wherein the rotating track is alignable with track assembles which can be coupled to the track components.

19. The transport system of claim 18, wherein the at least one hub component comprises:
- a base plate;
- a bearing assembly rotatably mounting the rotating track to the base plate; and
- a lock assembly structured to lock the rotating track.

20. The transport system of claim 19, wherein the track assemblies are adjustable expansion joints.

21. The transport system of claim 16, wherein the plurality of truck assemblies comprise:
- a plurality of wheels or casters structured to engage the plurality of track components and the rotating track;
- a plurality of guiding cams extending downward to ensure the truck assemblies remain on the plurality of track components when in the assembled state; and
- wherein the rotatable portion comprises a rotatable mounting assembly structured to connect with a corner block of a container.

22. The transport system of claim 21, wherein the brake system comprising always-on brake functionality, requiring positive disengagement, and which comprises:
- a mechanism structured to automatically retain brake pads in a stopping position; and
- a release mechanism to release the brake pads from the stopping position, by application of operator force.

23. The transport system of claim 22, wherein the brake system further comprises a latch system to maintain the brake pads in the released position.

24. A transport system, comprising:
- a plurality of truck assemblies each comprising:
  - a base plate;
  - a rotatable mounting assembly mounted to the base plate by a bearing assembly, and which is structured to connect with a corner block of a container;
  - a plurality of wheels or casters connected to a downwardly extending plate from the base plate; and
  - a plurality of guiding cams extending downward to ensure the truck assemblies remain on a track assembly.

25. The transport system of claim 24, wherein the plurality of truck assemblies includes at least one active truck assembly comprising at least one of a motor and braking system.

* * * * *